(12) United States Patent
Fosseen

(10) Patent No.: US 6,370,472 B1
(45) Date of Patent: Apr. 9, 2002

(54) METHOD AND APPARATUS FOR REDUCING UNWANTED VEHICLE EMISSIONS USING SATELLITE NAVIGATION

(75) Inventor: Dwayne Fosseen, Radcliffe, IA (US)

(73) Assignee: Mirenco, Inc., Radcliffe, IA (US)

( * ) Notice: Subject to any disclaimer, the term of this patent is extended or adjusted under 35 U.S.C. 154(b) by 0 days.

(21) Appl. No.: 09/662,951

(22) Filed: Sep. 15, 2000

(51) Int. Cl.[7] ............................ F02D 9/08; G01M 15/00
(52) U.S. Cl. ...................... 701/102; 73/23.31; 73/117.3; 123/399
(58) Field of Search ............................... 123/352, 361, 123/399; 73/23.31, 23.32, 116, 117, 117.2, 117.3; 701/102

(56) References Cited

U.S. PATENT DOCUMENTS

| | | | | |
|---|---|---|---|---|
| 3,516,287 A | * | 6/1970 | Masuda et al. ............... | 73/117 |
| 3,926,043 A | * | 12/1975 | Marshall et al. ............... | 73/117 |
| 4,186,593 A | * | 2/1980 | Watanabe ...................... | 73/117 |
| 5,195,038 A | * | 3/1993 | Yagi et al. ..................... | 73/116 |
| 5,315,977 A | * | 5/1994 | Fosseen ........................ | 123/357 |
| 5,583,765 A | * | 12/1996 | Kleehammer ................... | 701/1 |
| 5,693,872 A | * | 12/1997 | Quinn ........................ | 73/23.31 |
| 6,016,795 A | * | 1/2000 | Ohki ........................... | 123/681 |

\* cited by examiner

*Primary Examiner*—Tony M. Argenbright
(74) *Attorney, Agent, or Firm*—Daniel A. Rosenberg; Kent A. Herink; Davis Brown Law Firm

(57) ABSTRACT

A vehicle use profile is created by driving a vehicle with a throttle-controlled engine over a predetermined course at a first period of time. A vehicle use parameter is recorded at predetermined intervals along the course along with the throttle level. At a later time, a vehicle is driven over the same predetermined course with the throttle controlled according to the vehicle use profile. The vehicle use parameter can include real time position, speed, and elevation taken from a GPS receiver, or vehicle emission levels, wind resistance, or vehicle speed, taken real time from various sensors, wherein the vehicle is controlled in accord to one or more of the parameters.

6 Claims, 2 Drawing Sheets

METHOD AND APPARATUS FOR REDUCING UNWANTED VEHICLE EMISSIONS USING SATELLITE NAVIGATION

INCORPORATION BY REFERENCE

U.S. Pat. No. 5,315,977, issued on May 31, 1994, entitled FUEL LIMITING METHOD AND APPARATUS FOR AN INTERNAL COMBUSTION VEHICLE, is hereby incorporated by reference.

BACKGROUND OF THE INVENTION

The present invention relates to a method and apparatus for the control of a vehicles throttle for the purpose of reducing unwanted emissions. In particular, creating a vehicle use profile by driving a vehicle over a predetermined course while monitoring a vehicle use parameter and a throttle level, and then driving a vehicle over the course wherein the throttle level is controlled according to the profile.

Internal combustion engines burn a mixture of fuel and air in a combustion chamber. The ignition of the air/fuel mixture creates the energy to drive the engine, but also creates a wide variety of exhaust gases. Also, even the most efficient internal combustion engines fail to burn all of the available air/fuel mixture. Thus, in addition to exhaust gases, some amount of unburned fuel comprise unfortunate by-products of all internal combustion engines. Some portion of these by-products of combustion find their way into the engine causing deterioration of the engine, while the remainder of the by-products travel through the exhaust system of the vehicle, and eventually enter the atmosphere in one form or another. Compounding the problem is the fact that the natural consequence of driving a vehicle is the degeneration of the engine in terms of its ability to run efficiently. Thus, even the most fuel-efficient vehicles fully equipped with pollution reduction devices, eventually will become progressively more wasteful and inefficient over time. The effect on the environment of exhaust gases and the other by-products of internal combustion engines comprises one of the single greatest problems faced by today's society. The prior art offers a myriad of solutions to the problems created by the by-products of combustion, however, much room for improvement still exists.

Some of the common pollutants that result from internal combustion of hydrocarbon fuels include carbon dioxide ($CO_2$)—the necessary by-product of complete combustion and a prime contributor to global warming, exhaust gases like the toxin carbon monoxide (CO), and hydrocarbons (HC) that result from incomplete combustion of the air/fuel mixture. Furthermore, various unfavorable nitrogen oxides ($NO_x$) result from the thermal fixation of nitrogen that takes place from the rapid cooling of burnt hydrocarbon fuel upon contact with the ambient atmosphere. The amount of these pollutants produced varies based on a number of factors including the type of engine involved, the age and condition of the engine, the combustion temperature, the air/fuel ratio, just to name a few. Many devices attempt to regulate and control these mechanical, environmental, and chemical processes for the purpose of reducing pollution. However, one factor that receives little attention but plays a major role in the amount of pollution generated by vehicles comprises driver behavior and technique.

For example, many commercial trucking companies evaluate their drivers based on fuel economy. In other words, even on the same routes with the same vehicles and driving conditions the average miles per gallon ("mpg") can vary widely among a group of experienced drivers. Some companies in the industry even set minimum mpg requirements for their drivers. Clearly, the less fuel a driver burns the less pollutants that reach the environment. Furthermore, given the high price of fuel, efficient driving technique can result in considerable cost savings. While all modern vehicles contain pollution control devices, these devices generally do very little to correct inefficient driving habits.

In particular, all modern vehicles come with catalytic converters in the exhaust system. The converters act to convert exhaust gases like CO and HC into $CO_2$ and $H_2O$ respectively. More advanced catalytic converts convert NO and $NO_2$ to $N_2$. However, since the catalytic converter acts on exhaust gases, they are useless in preventing the inefficient and wasteful burning of fuel in the first place. Cruise controls systems comprise another example of a device designed, in part, to reduce pollution and/or conserve fuel. The systems can keep an automobile at a constant speed over long periods of time despite changes in terrain. While this can result in some increased efficiencies by eliminating wasteful accelerations and de-accelerations, the systems in some cases actually promote fuel waste through an inability to anticipate changes in road conditions. For example, in hilly conditions the cruise control will slow the vehicle down the hill and then accelerate the vehicle on the upslope in an effort to maintain an even speed. If the cruise control system could look ahead, it could allow the vehicle to pickup some speed and momentum down the hill that the vehicle could then use to reduce the fuel required to travel up the next hill. In this manner, by rigidly maintaining a constant speed, cruise control systems can actually inhibit fuel economy and increase exhausted pollutants.

This ability to anticipate upcoming road conditions and adjust fuel consumption embodies one of the techniques used by more fuel-efficient drivers. Drivers learn this, and other techniques, through trial and error experience gained from highway driving. Unfortunately, many other drivers develop wasteful and inefficient driving habits through the same process. Rapid accelerations waste fuel and pass unburned fuel into the exhaust and engine causing damage to the engine and increasing harmful pollutants to the environment. Jackrabbit starts result in jackrabbit stops, which develops a cycle of poor driving that even the best of today's modern pollution control devices cannot correct. Thus, a need exists for a method and apparatus to profile and repeatable duplicate the driving behavior and habits of fuel-efficient drivers.

SUMMARY OF THE INVENTION

An object of the present invention comprises providing a method and apparatus for controlling a vehicle according to a vehicle use profile.

These and other objects of the present invention will become apparent to those skilled in the art upon reference to the following specification, drawings, and claims.

The present invention intends to overcome the difficulties encountered heretofore. To that end, a vehicle use profile is created by driving a vehicle with a throttle-controlled engine over a predetermined course at a first period of time. A vehicle use parameter is recorded at predetermined intervals along the course along with the throttle level. At a later time, a vehicle is driven over the same predetermined course with the throttle controlled according to the vehicle use profile.

DETAILED DESCRIPTION OF THE INVENTION

Figure 1:
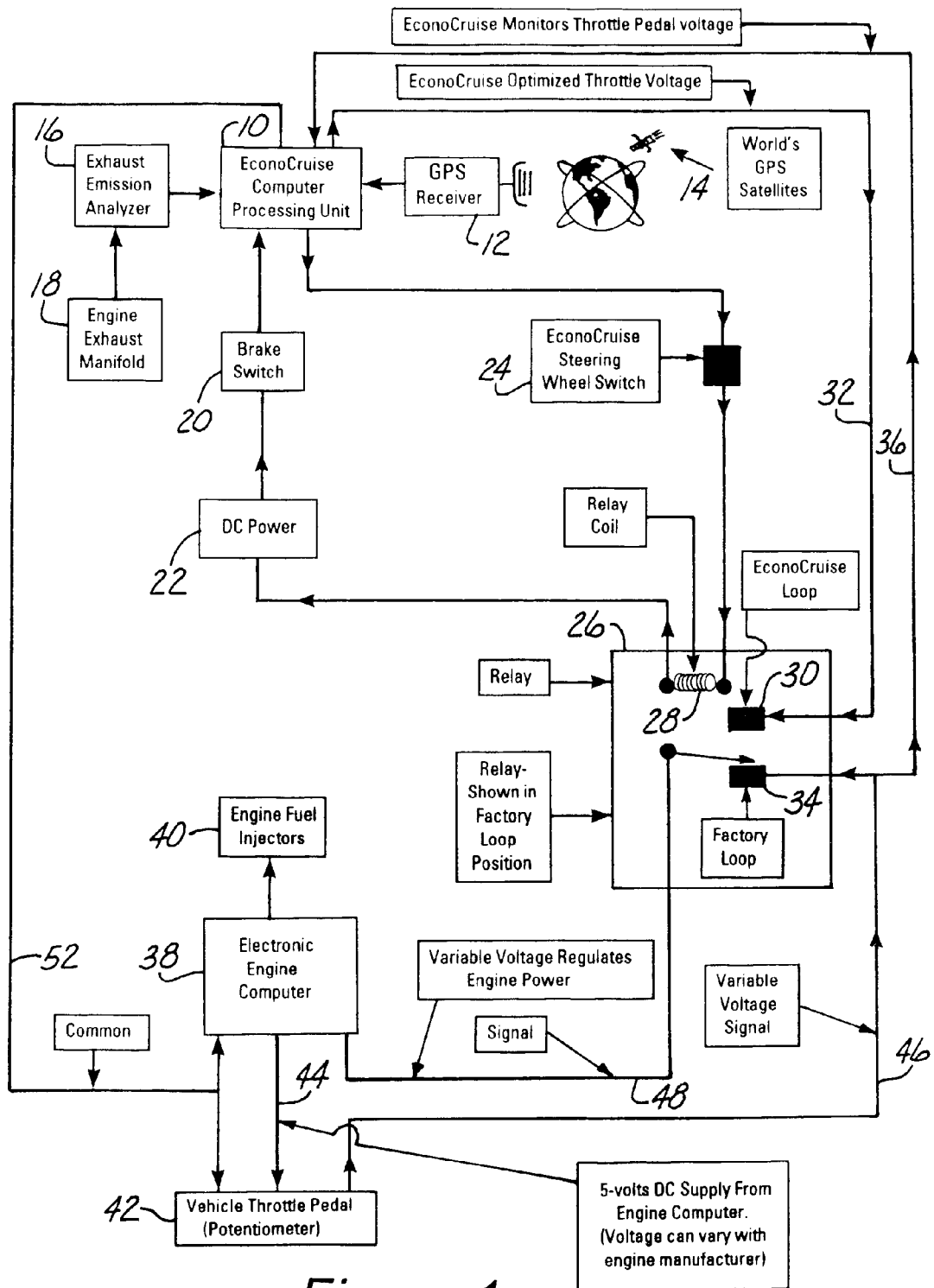
FIG. 1 is a schematic drawing of the present invention for control of an engine.

In the Figures, FIG. 1 shows a schematic diagram of the present invention. In modem vehicles, an electronic engine computer 38 controls important engine functions including throttle control. Typically, the engine computer 38 sends and receives a throttle voltage control signal to and from a throttle pedal 42 in the form of a 5 v DC signal. The throttle voltage signal varies in proportion to the desired change in vehicle speed. In the case of car controlled manually by the driver, the engine computer 38 receives throttle voltage control signal along a direct path between the engine computer 38 and the throttle pedal 42. The engine computer 38 can then translate the throttle voltage into the appropriate signal to the fuel injectors 40 to ensure an engine response in proportion to the throttle voltage.

In most modem vehicles, the engine computer 38 can take control of the throttle through a cruise control device. In this case, the engine computer 38 would take control of the throttle voltage via a throttle voltage control signal path between the engine computer 38 and the throttle pedal 42. This creates a feedback loop that allows the engine computer 38 to adjust the throttle voltage at the pedal 42 to control the vehicle to a certain speed.

The present invention builds on the cruise control model in the following manner. The invention includes a general-purpose computer 10 that uses a software control program to take control of the throttle voltage and control of a vehicle in accord with a pre-selected response from a plurality of external sensors. Those of ordinary skill in the art will appreciate that the computer 10 could consist of a lap top computer, a dedicated embedded controller device, or any other similar computer. In particular, the computer 10 is connected to a Global Positioning Satellite receiver 12 ("GPS") that receives absolute position information from an array of satellites 14. The computer 10 is also connected to an exhaust emission analyzer 16 that is in operable communication with the exhaust manifold 18 of a vehicle. In the preferred embodiment of the present invention the exhaust analyzer 16 consists of a Model 6600 miniature automotive analyzer commercial available from Andros Incorporated of Berkeley, Calif. However, those of ordinary skill in the art will understand that any similar suitable analyzer could be used. In addition, the computer 10 interfaces with the engine computer 38 and the throttle pedal 42 in a manner that allows the computer 10 to control the throttle pedal 42 in the manner of a cruise control device.

The invention employs a simple relay switch 26, which switches between a factory throttle control position and a position whereby the computer 10 controls the throttle. In particular, the relay switch 26 employs a relay coil 28 that triggers the relay switch 26. FIG. 1 shows the relay switch 26 set to the factory throttle control position 34. In position 34, the engine computer 38 assumes standard control over the throttle pedal 42. In position 34 the engine computer 38 controls the throttle pedal 42 along the throttle voltage control signal path 44. The throttle pedal communicates with the engine computer 38 along the throttle voltage control signal path 46, 48. In the factory throttle control position 34, throttle voltage control signal path 36 allows the computer 10 to monitor and record the throttle voltage signal.

With the relay switch 26 set to a throttle voltage control position 30 the computer 10 assumes control over the throttle pedal 42, and control over the throttle signal sent to the engine computer 38. In position 30, the throttle signal travels from the throttle pedal 42 along the throttle voltage control path 46, 36 to the computer 10. The computer 10 can then send the throttle voltage signal back to the engine computer 38 and to the throttle pedal 42 along throttle voltage control path 32, 48, 44. The invention includes a common ground path 52 linking the computer 10, engine computer 38, and throttle pedal 42. Two manually activated switches actually trigger the relay switch 26. A brake switch 20 is connected through a DC power supply 22 to the relay switch 26, to allow the driver to manually set the relay switch 26 to the factory control position 34 by tapping the brake pedal. A steering wheel switch 24 allows the driver to manually set the relay switch 26 in either the factory control position 34 or the computer control position 20.

Figure 2:
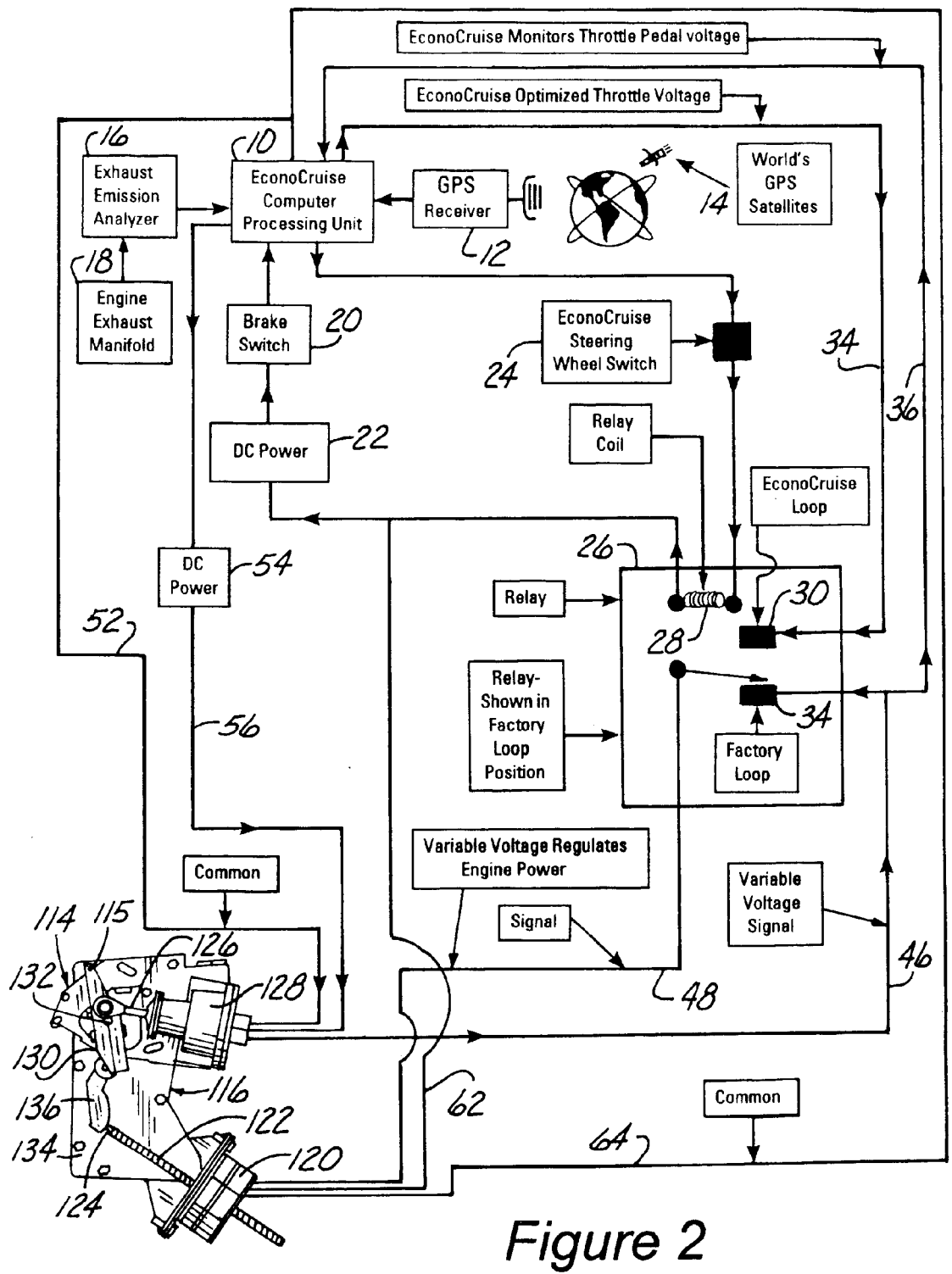
FIG. 2 is a combination schematic and plan view of an alternative embodiment of the present invention for control of an engine without an electronic throttle.

FIG. 2 shows an alternative embodiment of the present invention for use with vehicles without engine computers, or electronic voltage control capacity. In this embodiment, a throttle apparatus 114 is mounted atop a governor control box 116. The governor control box 116 includes a top plate 134 on which is mounted a speed control lever 130. The speed control lever 130 pivots about the pivotal mount 132 that extends down through the top plate 134. The speed control lever 130 is controlled in response to a throttle cable (not shown) that extends from the throttle pedal or foot-operated accelerator pedal (not shown) to a throttle cable hook 115. The throttle cable hooks to the speed control lever 130, and moves the speed control lever 130 in response to changes in the throttle pedal as controlled by the driver's foot. Movement of the speed control lever 130 serves to control the flow of fuel into the engine, thereby controlling the vehicle speed. Also mounted to the top plate 134 is a stop lever 136. The stop lever 136 is mounted for pivotal movement on a vertical shaft that extends through the top plate 134. The stop lever 134 is biased toward an ideal position. Placing a physical stop in the path of the stop lever 134 serves to limit the maximum movement of the speed control lever 130, and thereby limits the maximum rate that fuel enters the engine. The exact operational details of the interaction between the governor control box 16 and its related engine components are disclosed in more detail in U.S. Pat. No. 5,315,977.

In the present invention, a linear actuator 120 (or alternatively a stepper motor), controlled by the computer 10, is mounted to the top plate 134 of the governor control box 116. The linear actuator 120 is interfaced with the computer 10 by the common ground line 64, and along the throttle control signal path 48, 36. The linear actuator 120 is linked to DC power supply 22 along signal path 62. The linear actuator 120 has a screw 122 that is extendable and retractable in fine, exact, and reproducible increments. An end 124 of the screw 122 serves as a mechanical stop for the stop lever 136. The linear actuator 120 interfaced to the computer 10 provides a means to control the throttle of engines that do not include an electronic throttle voltage signal.

A potentiometer 128 is mounted to the top plate 134. The potentiometer 128 includes cylinder 126 that mounts to the speed control lever 130. The cylinder 126 extends and retracts in response to movement of the speed control lever 130. The position of the cylinder 126 is translated to a voltage signal by the potentiometer 128, wherein the signal correlates to the throttle position. The voltage signal is interfaced with the computer 10 in the following manner. The potentiometer 128 has a common ground 52, and is powered by DC power supply 54. The DC power supply 54 is linked to the computer 10 and sends power to the potentiometer 128 along signal path 56. An output signal is sent from the potentiometer 128 to the computer along signal path 46, 36. The output signal consists of the throttle position as measured and converted to an electronic voltage signal by the potentiometer 128. In this manner, the potentiometer 128 allows the computer to monitor an electronic throttle voltage signal.

The computer 10, linked to the potentiometer 128 and linear actuator 120, controls the operation of the engine in the manner described above in reference to engines with electronic throttle control. In the embodiment of the invention shown in FIG. 2, when the relay switch 26 is in the factory control position 34, the linear actuator 120 is programmed to withdraw the screw 122 to its retracted position such that the stop lever 136 and the speed control lever 130 operate without interference. In the factory control position 34, the computer 10 can still monitor the throttle voltage via the signal path 46, 36 extending from the potentiometer 128 to the computer 10. With the relay switch 26 in the throttle voltage control position 30, the computer 10 receives the converted throttle voltage signal from the potentiometer 128 along the signal path 46, 36 and can control the throttle by sending signals to the linear actuator 120 along the signal path 34, 48. Thus, the computer 10 can execute engine control in the same manner described hereinabove in reference to the embodiment shown in FIG. 1. Of course, those of ordinary skill in the art will understand that, without departing from the scope of the intended invention, the specific configuration required for controlling vehicles without electronic throttles and/or electronic engine computer will vary depending on the make and model of the vehicle involved.

In the various manners described hereinabove, the computer 10 can directly assume control of the throttle voltage in response to one or more of the sensors. Specifically, the computer 10 can take control of the throttle voltage and manage the voltage in response to at least three sensor inputs. First, the computer can manage the throttle position in the same manner as a conventional cruise control. That is the system can adjust the throttle voltage based on driving conditions to maintain as close as possible a constant speed. Secondly, the computer 10 can control the throttle voltage in response to input from the emission analyzer 16. In this mode, the computer may monitor the emission analyzer to ensure that the emissions stay below a certain level. For example, through experimentation it may be desired to keep emission levels below a certain opacity threshold (where 0% would be completely clear exhaust and 100% would be completely opaque exhaust), or below some other predetermined level of a particular exhaust gas. If the threshold level is exceeded the computer can reduce the throttle voltage or institute some change in the fuel makeup or mixture until the emission level drops below the threshold.

Third, the computer 10 could control the throttle voltage in response to information from the GPS receiver 12. This control mode would likely involve the establishment of a throttle voltage profile. This can be accomplished by allowing a driver of particularly high skill in driving to conserve fuel to drive the vehicle over a predetermined course. The relay switch 26 would be set to the factory control position 34, enabling the computer 10 to collect throttle voltage information, and time, position, and elevation data from the GPS receiver 12 in communication with the satellites 14. Furthermore, vehicle speed could also be monitored by the computer 10 or computed based on the time and position data. This information could be collected on a periodic basis, for example, once a second or once every 100 feet, or any other convenient interval. This information can be recorded and used at a later date on a trip by another driver over the same or substantially similar route, in the same or substantially similar vehicle. On the return trip the computer 10 can use the previously created profile to control the throttle position. Again, with the GPS sensor 12 activated, the computer 10 can compare the current vehicle position and throttle voltage to the historical data, and use adaptive techniques to match the current throttle voltage to the throttle voltage at the same location based on the historical data.

In addition to the sensors mentioned hereinabove, other sensors could be used with the present invention. For example, a wind resistance sensor could be used to calculate wind speed and direction. This information would be used by the computer 10 to adjust the throttle voltage. The computer 10 would be able to calculate adjustments to throttle voltage to compensate or adjust for any differences between current wind resistance and the wind resistance at the time the historical data was collected.

In practice, the best results, i.e. those results that minimize emissions and maximize fuel economy, may be achieved by a control program that combines all responses to all three sensors to achieve the most efficient performance. In general, the control program would follow the control flow represented by the following pseudo code:

BEGIN CONTROL LOOP [While Brake_Pedal=On]
{
   OBSERVE Pollution
   CALCULATE c=Fuel(Pollution)
   CALCULATE b=Prediction(x)
   CALCULATE a=Throttle(x)
   CALCULATE Throttle_Power_New=a+b+c+ Throttle_Power_Old
   Apply Throttle_Power_New
   CALCULATE Throttle_Power_Old=Throttle_Power_New
}
REPEAT LOOP Pollution is the response from the emission analyzer 16. The value of x equals the vehicles real world position, speed, and/or elevation as determined by the GPS receiver 12. The Fuel function uses the parameter Pollution to calculate the throttle voltage adjustment coefficient c that becomes a component of the throttle adjustment equation. If the emission threshold is within the predetermined tolerance then the value of c equals zero. If the emission threshold is exceeded then the value of c would become negative, exerting a drag on throttle voltage. This would then begin to slow the vehicle until the emission level drops below the threshold level. Alternatively, if the emission threshold is exceeded the fuel mixture or composition could be altered by the computer 10 to reduce the emissions. In particular, the air/fuel mixture could be adjusted, or water and/or a mixture of water and alcohol could be added to the fuel mixture to reduce emissions. Water and/or a water and alcohol mixture could be either port injected or injected directly into the combustion chamber to reduce, for example, oxides of nitrogen ($NO_x$).

The Prediction function uses the parameter x to calculate the throttle voltage adjustment coefficient b. The Prediction equation could be as simple as exactly matching the historical throttle voltage to the current voltage. In practice, however, driving and vehicle conditions vary enough that this method may not produce the best results. An alternative Prediction function would match the slope of the historical run to the current run. In other words, the function would look ahead a specified number of control points (based on either time or distance) and determine the slope of the historical throttle voltage versus time/distance curve, and then apply that slope to the current data to adjust current throttle position. The coefficient b could be negative or positive depending on whether the throttle voltage needs to be decreased or increased, respectively.

The Throttle function uses the parameter x to calculate the throttle voltage adjustment coefficient a. The Throttle function comprises the direct attempt to control speed, and would use the standard cruise control equations known in the art to perform this function. These equations attempt to drive the difference in actual speed and a target speed (delta speed) to zero. In situations where either coefficient b or c become large enough that an imbalance exists between the values of b or c, and a, then an adjustment to the target speed will be needed. This will result, for example, when the historical profile shows that the vehicle is approaching a major uphill or downhill section of the road. In the case of a downhill section, the Prediction function will allow the vehicle to gain speed down the hill, while at the same time the Throttle function will attempt to slow the vehicle. If this imbalance will persist over more than a couple of control points, the target speed would be raised to correct the imbalance. In the situation where the vehicle is approaching a major uphill section requires the reverse control method.

The values of the coefficients a, b, c can be determined by the computer 10 based on a predetermined weighting scheme that seeks to achieve the best overall performance, or the driver can set or influence the values on a real time basis. For example, the driver could enter information into the computer 10 instructing the computer 10 to control the throttle voltage to maximize or minimize fuel economy, emissions, or to maintain a constant speed. The relative importance the driver gives to these factors would determine the weight given to each of the coefficients a, b, c.

Another feature of the present invention is the ability of the computer 10 to predict and report the difference in fuel economy or the amount of emission reduction achieved under throttle control. The computer 10 can track the changes, corrections, or adjustment made to the throttle voltage in relation to straight cruise control, for example, and keep a log of the improvement to fuel economy or emission reduction that results. This information would be useful in quantifying the value of the invention in terms of fuel savings, or emission reduction.

Those of ordinary skill in the art will understand that the exact control method and equations will vary depending on the vehicle, the vehicle load, the road, and driving conditions. Thus, some experimentation and profiling will be required in order to determine the exact equations and weighting factors.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

What is claimed is:

1. A method of controlling a vehicle according to a vehicle use profile, said method comprising:
    creating a vehicle use profile, comprising:
        driving a profiling vehicle with a throttle controlled engine over a predetermined
        course at a first period of time;
        recording a vehicle use parameter at predetermined intervals over said course; and
        recording a throttle level at said predetermined intervals over said course;
    driving a duplicating vehicle over said predetermined course at a second period of time,
    wherein said throttle level is controlled according to said profile.

2. The invention in accordance with claim 1 further providing a global positioning satellite receiver located on said vehicles for receiving satellite signals that allow for locating a position of said vehicles, and wherein said vehicle use parameter comprises said position of said vehicle at said predetermined intervals.

3. The invention in accordance with claim 1 further providing an emission analyzer located on said vehicles for analysis of exhaust emissions, and wherein said vehicle use parameter comprises said vehicle exhaust emission level at said predetermined intervals.

4. The invention in accordance with claim 1 wherein said profile vehicle and said duplicating vehicle are substantially similar vehicles.

5. The invention in accordance with claim 1 wherein said profile vehicle and duplicating vehicle are the same vehicle.

6. An apparatus for controlling a vehicle according to a vehicle use profile, said apparatus comprising:
    a vehicle having an engine with a computer controlled throttle;
    a general purpose computer operatively connected to said throttle creating a vehicle use profile, comprising:
        driving a profiling vehicle with a throttle controlled engine over a predetermined course at a first period of time;
        recording a vehicle use parameter at predetermined intervals over said course; and
        recording a position of said throttle at said predetermined intervals over said course;
    driving a duplicating vehicle over said predetermined course at a second period of time,
    wherein said throttle position is controlled according to said profile.

* * * * *